3,792,125
TRANSPARENT HEAT RESISTANT GUM PLASTIC
John M. Wefer, Wayne, N.J., assignor to Uniroyal, Inc., New York, N.Y.
No Drawing. Filed Dec. 2, 1971, Ser. No. 204,368
Int. Cl. C08f 15/40
U.S. Cl. 260—876 R               4 Claims

ABSTRACT OF THE DISCLOSURE

Transparent, heat resistant thermoplastic compositions are prepared from terpolymers of t-butylstyrene, acrylonitrile and methylmethacrylate blended with grafts of the terpolymers onto polybutadiene rubber or a rubbery styrene-butadiene copolymer.

Transparency as well as good thermal and mechanical properties can be achieved in the gum plastic blends with a wide variety of monomer ratios in the resinous terpolymers.

---

This invention relates to (A) a resinous copolymer of t-butylstyrene, acrylonitrile and methylmethacrylate, with or without styrene, (B) a graft copolymer of t-butylstyrene, acrylonitrile and methylmethacrylate, with or without styrene, onto a rubbery butadiene polymer, and (C) a gum plastic which is a blend of (A) and (B).

The invention is directed particularly to a transparent gum plastic that is not highly colored and has a good balance of physical properties including high impact strength and high heat deflection temperature.

Certain prior gum plastic compositions, for example, ones prepared from styrene-acrylonitrile resins and chemically combined rubbery butadiene polymers (so-called "ABS" plastics) are opaque. Generally these materials also have low heat resistance. A method that has been used to raise the heat deflection temperature is to employ substituted styrenes, for example, alpha-methylstyrene, instead of styrene in the resinous component of the plastic (U.S. Pat. 3,111,501, Thompson, Nov. 19, 1963), but these materials are still opaque where a rubbery butadiene homopolymer or rubbery styrene-butadiene copolymer is employed as the rubbery component.

The heat-resistant qualities of t-butylstyrene resins is well known (U.S. Pat. 2,723,261, Levine et al., Nov. 8, 1955).

U.S. Pat. 3,426,103, Hall et al., Feb. 4, 1969, describes a transparent gum plastic of improved heat resistance in which a t-butylstyrene-acrylonitrile copolymer is used in the resinous component. Unfortunately, the combination of transparency and desirable physical properties is achieved in such composition only with a very narrow range of monomer ratios. Also, if the acrylonitrile content is increased in an effort to improve the impact strength or to adjust the refractive index of the resin, the molded copolymer has an objectionable yellow-orange color.

In accordance with the invention, it has been found that transparent, heat resistant, hard, rigid gum plastics can be made, without encountering objectionable yellow-orange color, from a blend of a resinous terpolymer of t-butylstyrene, acrylonitrile and methylmethacrylate with a graft copolymer of t-butylstyrene, acrylonitrile and methylmethacrylate onto a rubbery butadiene polymer.

The use of this termonomer system in the preparation of both resin and graft suprisingly allows great latitude of resin compositions that can be prepared while still obtaining transparency in both the resin and the graft and at the same time still making it possible to preserve the refractive index match of resinous terpolymer to rubbery polymer that is essential for transparency in the gum plastic. It is also possible to use a mixture of styrene and t-butylstyrene, instead of t-butylstyrene alone, in making the resin and the graft.

In one aspect, the invention is directed to (A) a novel resinous copolymer of (a) from 35 to 80% by weight of t-butylstyrene, with or without styrene in weight ratio of from 100:0 to 60:40;
(b) from 10 to 40% by weight of acrylonitrile; and
(c) from 10 to 40% by weight of methylmethacrylate.

In another aspect, the invention is concerned with (B) a graft copolymer of (i) the aforesaid monomers in the aforesaid proportions on (ii) a rubbery spine selected from the group consisting of polybutadiene and butadiene-styrene copolymer containing up to 30% by weight of styrene, the weight ratio of said resin-forming monomers (i) to rubbery spine (ii) being from 90:10 to 25:75.

In yet another aspect, the invention contemplates a transparent, heat-resistant, hard, rigid gum plastic which is a blend of the aforesaid separately prepared resin (A) with the described graft copolymer (B) in such proportions that the over-all ratio of total resin to rubber is from 95:5 to 60:40 by weight.

A preferred practice involves such a resin, graft copolymer, and blend of resin with graft copolymer, in which (a) constitutes from 40 to 70% by weight of t-butylstyrene, with or without styrene in weight ratio of from 100:0 to 70:30, while (b) amounts to 15 to 35% and (c) amounts to 10 to 40%, the rubbery spine (ii) being butadiene-styrene copolymer containing about 10% styrene, and the over-all ratio of total resin to rubber being from 85:15 to 70:30.

In a more preferred practice component (a) in both the separately prepared resin (A) and in the resin-forming monomers (i) of the graft copolymer (B) is t-butylstyrene itself without styrene, while the rubbery spine in (ii) is butadiene-styrene copolymer containing up to about 25% of styrene.

Still a more highly preferred embodiment of the invention provides, as the resinous copolymer (A), an interpolymer of (a) 40 to 70% of t-butylstyrene itself with no styrene, (b) 15 to 35% acrylonitrile and (c) 10 to 40% methylmethacrylate. Similarly a more highly preferred graft copolymer (B) utilizes such monomeric constituents in the stated proportions on a rubbery polymer spine which is a butadiene-styrene copolymer containing about 10% of styrene. Likewise the more highly preferred gum plastic is a blend of separately prepared resin (A) and graft copolymer (B) as described, in such proportions that the over-all weight ratio of total resin to rubber is from 85:15 to 70:30.

The resinous copolymer is conveniently prepared by any of the conventional techniques of emulsion polymerization, but other methods such as polymerization in a solvent or in bulk may also be employed. It is surprising that the resinous terpolymer of the invention made from t-butylstyrene, acrylonitrile and methylmethacrylate is transparent. It is indeed unusual for a terpolymer to be transparent, especially over a substantial range of compositional ratios. Ordinarily terpolymers are opaque, presummably due to the fact that their composition (and therefore their refractive index) varies considerably with conversion, producing a nonuniform product. Transparency of the resin is of course an essential prerequisite of the invention since, if the resin itself were opaque, transparent blends with graft could not be made therefrom. Another advantageous feature of the novel terpolymer of the invention is that the resin refractive index can be adjusted (to match that of a particular rubber) by varying the methylmethacrylate level while keeping the acrylonitrile content at an optimum value, consistent with good impact and absence of color. Thus, for example, a 50:30:20 t-butyl - styrene-acrylonitrile-methylmethacrylate terpolymer is nearly colorless, yet gives a gum plastic having high impact strength. Similarly, the tetrapolymer of the invention (t-butylstyrene-styrene-acrylonitrile-methylmethacrylate) is also, surprisingly, a transparent material, and is particularly useful for producing an optimum balance between heat resistance and mechanical properties, as will be made manifest in the working examples below.

The graft copolymers of the invention may be prepared by emulsion polymerization of the three (or four) resin-forming monomers in the presence of an already-formed latex of polybutadiene rubber or a rubbery styrene-butadiene copolymer containing up to 30% styrene. Other graft copolymerization methods, employing bulk or solution polymerization, or combinations of these methods, may be used. The ratio of the resin-forming monomers used in the graft copolymerization may be the same as that used in the resin. Like the resin, the graft copolymer is, surprisingly, a transparent material. It is known to those practiced in the art, that often not all of the polymerized monomers become chemically attached (grafted on) to the rubbery component. Thus the material herein referred to as "graft copolymer" is simply the polymeric product of the grafting reaction, even though all of the resin-forming monomers may not be chemically bound to the rubbery polymer.

In the preparation of the gum plastic compositions of this invention the resinous copolymer which has been isolated from the polymerization medium is blended with the isolated graft polymer. The relative amounts of resin and graft used will depend upon the amount of rubber in the graft polymer and the amount of rubber which is desired in the final gum plastic. For example, a graft containing 50% by weight of rubbery polymer may be blended on a 50–50 basis with resinous terpolymer to afford a gum plastic containing 25% by weight of rubber. The final resin:rubber ratio is thus 75:25. The higher the rubber level, the tougher but softer will be the resultant gum plastic. Generally, rubber levels of 10–30% by weight (resin:rubber ratios of 90:10 to 70:30) are employed, but levels outside of these limits can be used if desired.

Mixers such as a Brabender mixer, a mill, or any suitable polymer mixing device may be used to blend the resin and graft components.

In place of the blending procedure described, the resin and graft polymer latices may be mixed together as such before isolation of the blend as dry material.

It is also possible to prepare the final gum plastic composition in one reaction. In such a case the three (or four) resin-forming monomers are emulsion polymerized in the presence of the polybutadiene latex or the styrene-butadiene copolymer latex as in the preparation of the graft polymer. Sufficient monomers are used so that the resin-rubber ratio of the polymeric product corresponds to that desired in the gum plastic.

Polybutadiene homopolymer and butadiene-styrene rubbers differ in their glass transition temperatures: polybutadiene prepared with free radical catalyst has a higher glass transition temperature than does polybutadiene in the 1,4-cis configuration, and conventionally prepared copolymers of butadiene and styrene have higher and higher glass transition temperatures as the fraction of styrene is increased. In general the impact resistance of gum plastics at low temperatures decreases as the glass transition temperature of the rubbery polymer employed in their preparation increases. At about room temperature and above, however, otherwise similar gum plastics derived from either polybutadiene or styrene-butadiene copolymers tend to have similar impact resistance.

The transparency of the gum plastic blend of the described transparent resin and rubber is a consequence of matching refractive indices of these two transparent components. In practice, it is not necessary for transparency that the refractive index of the resin be exactly the same as the refractive index of the rubber, since sufficient transparency for ordinary purposes is achieved when the respective refractive indices are nearly the same. The refractive index of resin of a given composition can be calculated as a weighted average of the refractive indices of homopolymers of the monomers in the resin. Knowing the refractive index of poly-ti-butylstyrene (about 1.54 at 25° C. with light of sodium D line wavelength), polystyrene (1.59), polyacrylonitrile (1.52) and polymethylmethacrylate (1.49), one can estimate the refractive index of any terpolymer or tetrapolymer resin of the invention. For a given resin, one can select a suitable rubber of approximately matching refractive index, ranging from polybutadiene (refractive index 1.515) to butadiene-styrene copolymer (e.g. refractive index 1.535 at 25% styrene). The relatively high refractive index of polystyrene (1.59) means that the tetrapolymer resin, which contains styrene, is particularly suitable for use with butadiene-styrene copolymer rubber of relatively high styrene content (e.g. above about 25%). There are numerous possible combinations of resin and rubber within the scope of the invention which provide transparency in combination with other desirable properties. Among these may be mentioned a 40:20:40 t-butylstyrene:acrylonitrile:methylmethacrylate resin plus a graft copolymer of same on polybutadiene rubber; 75:15:10 terpolymer of said monomers plus a graft of same on SBR containing 25% styrene; and 20:50:20:10 styrene:t-butylstyrene:acrylonitrile:methylmethacrylate tetrapolymer resin plus a graft of same on SBR containing 30% styrene. Further combinations are illustrated in the working examples below.

The products of this invention may be fabricated into useful articles by the known techniques such as compression and injection molding, extrusion or any other method conventionally used on thermoplastic materials. Useful articles of all sorts, such as transparent protective face shields, may be made from the compositions.

In the working examples below, for the purposes of testing samples were compression molded at about 340° F. into 3 x 5 x ⅛" plaques and fashioned into the required test shapes. Resistance of the samples to impact at room temperature was determined by the Notched Izod test as described in ASTM Method D256. Heat deflection temperatures were determined by ASTM Method D648. Torsional modulus at room temperature was measured by ASTM Method D 1043, and hardness of the samples was determined by ASTM Method D785, Procedure A, using the Rockwell R scale. Transparency was judged subjectively: newsprint, for example, could be clearly read through ⅛" thick test pieces. The samples were not given any special heat treatment, such as annealing, prior to testing.

The following examples will serve to illustrate the practice of the invention in more detail.

EXAMPLE 1

A. Preparation of terpolymer resins

Into a suitable reaction vessel were introduced 100 parts by weight of a mixture of t-butylstyrene (consisting of about 95% para and 5% meta isomers), acrylonitrile and methylmethacrylate in the ratios noted in Table I, 225 parts water, 75 parts of a 10% solution of sodium phenyl dodecyl sulfonate (a commercially available emulsifier known as Nacconol NRSF), 0.5 part of azobisisobutyronitrile and 0.17 part mixed tertiary alkyl mercaptans (commercially available material known as MTM-4). The vessel was flushed with nitrogen, sealed, and heated with agitation at 50° C. for a period of approximately 20 hours.

The resultant polymer latices were flocced in methanol, filtered, washed with methanol and dried in vacuo overnight. The degree of conversion of monomers to polymer based on the dry weight of the isolated resins was generally about 90%.

B. Preparation of graft copolymers

Into a suitable reaction vessel were introduced 50 parts by weight of a mixture of t-butylstyrene (consisting of about 95% para and 5% meta isomers), acrylonitrile and methylmethacrylate in the ratios noted in Table I, 100 parts of a conventionally prepared large particle size styrene-butadiene rubber latex (10:90 by weight of styrene:butadiene) containing 50% solids, 243 parts water, 5 parts of a 20% solution of sodium rosin soap (commercially available material known as Dresinate 731), 0.6 part 5% sodium hydroxide solution, and 0.3 part potassium persulfate. The vessel was flushed with nitrogen, sealed and heated with agitation for a period of about 20 hours. The resultant polymer latices were flocced in hot 10% magnesium sulfate solution, filtered, washed with water and dried in vacuo overnight. The degree of conversion of monomers to polymer was generally about 100%, giving graft copolymer compositions of 50 parts by weight each of resinous terpolymer and rubbery styrene-butadiene copolymer.

C. Preparation of the gum plastics

Resins and the corresponding graft copolymers described in A and B above were blended together at 340° F. for 10 minutes on a conventional two-roll polymer mill. All of the resins and corresponding grafts were blended on a 50-50 basis to produce gum plastics with an overall resin: rubber ratio of 75:25. In addition, some of the resins and grafts were blended together to produce gum plastics with an overall resin:rubber ratio of 85:15. The gum plastic blends were compression molded at 340° F. into 3 x 5 x 1/8" plaques which were fashioned into the required shapes for testing. The physical properties of these materials are shown in Table I, wherein the "Monomer Ratio" is expressed as the weight ratio of t-butylstyrene:acrylonitrile:methylmethacrylate. The same monomer ratio was used in preparation of both the resin and the graft copolymer. The "Resin Rubber Ratio" is the overall weight ratio of resin: rubber in the gum plastic. The "Impact" is the notched Izod impact strength expressed in foot-pounds per inch of notch. The "Heat Def." is the heat deflection temperature measured at 264 pounds per square inch, expressed in degrees Centigrade. "Tors. Mod." is the torsional modulus at room temperature expressed as pounds per square inch $\times 10^{-3}$. The "Hard." is the Rockwell hardness, R scale. The column headed "Trans." gives the transparency, "T" indicating transparent, "S" indicating slightly hazy and "O" representing opaque. The data under the heading "Control" in Table I were obtained from two gum plastics prepared in a manner similar to that described above, and are included for purposes of comparison. In these materials the resin is a styrene-acrylonitrile copolymer (standard 70:30 weight ratio) and the latex used in the preparation of the graft component is the same latex used in the preparation of the transparent gum plastics described above. These materials were chosen as controls since they represent normal gum plastics of the well-known ABS type.

The 20:40:40 material in Table I is marginal in transparency and is outside the invention. Materials containing over 40% acrylonitrile become increasingly yellow colored, trending to orange-yellow, whereas below this level the materials become nearly colorless.

TABLE I.—PROPERTIES OF GUM PLASTICS

| Monomer ratio | Resin: rubber ratio | Impact | Heat Def. | Tors. Mod. | Hard. | Trans. |
|---|---|---|---|---|---|---|
| 80:10:10 | 75:25 | 0.7 | 87 | 61 | 84 | T |
|  | 85:15 | 0.3 | 86 | 82 | 108 | T |
| 67.5:10:22.5 | 75:25 | 0.9 | 89 | 65 | 89 | T |
| 58.5:10:31.5 | 75:25 | 1.2 | 90 | 67 | 90 | T |
| 60:20:20 | 75:25 | 1.8 | 90 | 71 | 85 | T |
|  | 85:15 | 0.5 | 98 | 92 | 109 | T |
| 50:30:20 | 75:25 | 3.3 | 88 | 73 | 90 | T |
|  | 85:15 | 1.7 | 96 | 99 | 110 | T |
| 45:40:15 | 72:25 | 2.5 | 88 | 82 | 97 | T |
|  | 85:15 | 0.6 | 91 | 99 | 111 | T |
| 20:40:40 | 75:25 | 3.6 | 88 | 84 | 87 | S |
|  | 85:15 | 2.4 | 76 | 108 | 103 | S |
| Control | 75:25 | 6.7 | 86.5 | 88 | 98 | O |
| Do | 85:15 | 2.7 | 87 | 109 | 104 | O |

EXAMPLE 2

This example illustrates that transparency and good thermal and mechanical properties can also be achieved in cases where a mixture of styrene and t-butylstyrene replaces t-butylstyrene alone.

The samples were prepared in a manner similar to that described in Example 1 using a mixture of styrene, t-butylstyrene, acrylonitrile, and methylmethacrylate in weight ratio of 15:35:10:40, respectively. Resin and graft were blended together to produce transparent gum plastics of resin:rubber ratios of 75:25 and 85:15 as noted below under A and B.

Note that the balance between heat resistance and mechanical properties is improved by incorporation of styrene into the system. Comparing these samples to those described in Table I we note that B combines good impact resistance with a higher heat deflection temperature.

|  | A | B |
|---|---|---|
| Overall resin:rubber ratio | 75:25 | 85:15 |
| Notched Izod impact strength (ft.-lb. per inch of notch) | 3.5 | 1.9 |
| Heat deflection temperature (° C. at 264 p.s.i.) | 86 | 102 |
| Torsional modulus (p.s.i. $\times 10^{-3}$) | 73 | 98 |
| Rockwell Hardness (R scale) | 91 | 109 |
| Transparency | (1) | (1) |

[1] Transparent.

Having thus described the invention, what it is desired to claim and protect by Letters Patent is:

1. A transparent, heat resistant, hard, rigid gum plastic which is a blend of (A) separately prepared resinous copolymer of:
   (a) from 35 to 80% by weight of t-butylstyrene, with or without styrene in weight ratio of from 100:0 to 60:40;
   (b) from 10 to 40% by weight of acrylonitrile; and
   (c) from 10 to 40% by weight of methylmethacrylate, with (B) a graft copolymer of resin-forming monomers (i) on a rubbery spin (ii), said resin-forming monomers (i) being made up of:
   (a) from 35 to 80% by weight of t-butylstyrene, with or without styrene in weight ratio of from 100:0 to 60:40;
   (b) from 10 to 40% by weight of acrylonitrile; and
   (c) from 10 to 40% by weight of methylmethcrylate, said rubbery spine (ii) being selected from the group consisting of polybutadiene and butadiene-styrene copolymer containing up to 30% by weight of styrene;

The weight ratio of said resin-forming monomers (i) to rubbery spine (ii) being from 90:10 to 25:75, and the proportions of (A) and (B) being such that the overall ratio of total resin to rubber is from 95:5 to 60:40, by weight.

2. A transparent, heat-resistant, hard, rigid gum plastic as in claim 1 in which, in (A):
 (a) the amount of t-butylstyrene with or without styrene, is from 40 to 70% by weight and the weight ratio of t-butylstyrene to styrene is from 100:0 to 70:30;
 (b) the amount of acrylonitrile is from 15 to 35% by weight; and
 (c) the amount of methylmethacrylate is from 10 to 40% by weight, and in (B) the amounts of said resin-forming monomers (1) are
 (a) from 40 to 70% by weight of t-butylstyrene with or without styrene in weight ratio of from 100:0 to 70:30;
 (b) from 15 to 35% by weight of acrylonitrile; and
 (c) from 10 to 40% by weight of methylmethacrylate; and the said rubbery spine (ii) is butadiene-styrene copolymer containing 10% by weight of styrene, the proportions of (A) and (B) being such that the overall ratio of total resin to rubber is from 85:15 to 70:30, by weight.

3. A transparent, heat-resistant, hard, rigid gum plastic as in claim 1 in which (a) is t-butylstyrene and (ii) is butadiene-styrene copolymer containing up to 25% by weight of styrene, the proportions of (A) and (B) being such that the over-all ratio of total resin to rubber is from 95:5 to 60:40, by weight.

4. A transparent, heat resistant, hard, rigid gum plastic as in claim 2 in which (a) is t-butystyrene, and the proportions of (A) and (B) are such that the over-all ratio of total resin to rubber is from 85:15 to 70:30, by weight.

References Cited
UNITED STATES PATENTS

| | | | |
|---|---|---|---|
| 3,029,217 | 4/1962 | Roberts | 260—876 |
| 3,336,417 | 8/1967 | Sakuma | 260—880 |
| 3,354,238 | 11/1967 | Schmitt | 260—876 |
| 3,426,103 | 2/1969 | Hall | 260—880 |
| 3,641,208 | 2/1972 | Hall | 260—876 |

JAMES A. SEIDLECK, Primary Examiner

U.S. Cl. X.R.

260—80.78, 80.81, 880 R